Oct. 3, 1967　　　W. STEIN ETAL　　　3,345,301
POURABLE AND FREE-FLOWING DETERGENT, WETTING, AND
EMULSIFYING COMPOSITIONS
Filed Oct. 8, 1964
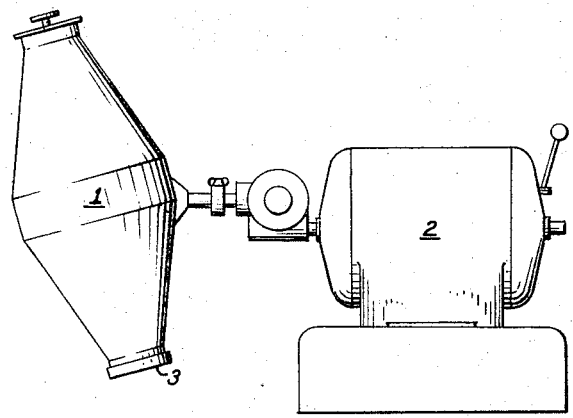
INVENTORS
WERNER STEIN,
HERBERT WEISS,
OTTO KOCH
BY
ATTORNEYS

United States Patent Office 3,345,301
Patented Oct. 3, 1967

3,345,301
POURABLE AND FREE-FLOWING DETERGENT, WETTING, AND EMULSIFYING COMPOSITIONS
Werner Stein, Erkrath-Unterbach, Herbert Weiss, Cologne-Deutz, and Otto Koch, Hilden, Rhineland, Germany, assignors to Henkel & Cie G.m.b.H., Dusseldorf, Germany, a corporation of Germany
Filed Oct. 8, 1964, Ser. No. 402,603
Claims priority, application Germany, Oct. 23, 1963, H 50,618
6 Claims. (Cl. 252—152)

This invention relates to new and improved detergent preparations which have excellent detergent, wetting, and emulsifying properties, and more particularly this invention relates to detergent, wetting, and emulsifying agents which are characterized by their ability to flow freely, and the absence of any tendency on their part to cake even when stored for prolonged periods.

It has been noted that many of the known synthetic surface-active agents which are used as detergents, wetting agents, and emulsifiers in pourable or free-flowing form, and particularly as powders, as well as the pourable preparations made therefrom by combination thereof with the usual accompanying substances, have certain undesirable properties and in particular tend to be sticky and to cake up under unfavorable atmospheric conditions. This phenomenon has been observed for synthetic surface-active agents of the sulfonate type among others.

Essentially, the invention comprises pourable and free-flowing detergents, wetting agents, and emulsifiers containing as active ingredients surface-active, non-aromatic—i.e., alkyl and cycloalkyl-sulfonates.

It is an object of the invention to improve the pouring and shelf-life properties of free-flowing detergent, wetting, and emulsifying compositions.

A further object of this invention is to provide highly effective detergent, wetting, and emulsifying agents in a solid form characterized by improved pouring, shelf-life, and stability properties.

Still a further object of the invention is to provide highly effective detergent, wetting, and emulsifying compositions containing as active ingredients surface-active alkyl or cycloalkyl sulfonates.

A still further object of the invention is to provide highly active detergent, wetting, and emulsifying compositions containing as active ingredients surface-active alkyl or cycloalkyl sulfonates as well as commercially attractive methods for preparing the same.

Further objects and advantages will become apparent in the course of the following description.

In accordance with the invention it has now been found that the above difficulties in pourability and storage may be overcome and detergents, wetting agents, and emulsifiers of improved efficiency in various forms, such as for example flakes, spray or drum dried, powdered, etc., containing as active ingredient surface-active alkyl or cycloalkyl sulfonates, may be obtained by adding to or incorporating therewith an amount of a sulfo-fatty acid salt having from 8 to 24, and preferably 10 to 18 carbon atoms in its molecule. The advantage of the invention can readily be appreciated from the fact that the substances, i.e., sulfo-fatty acid salts used for improving the powder properties of the detergent, themselves possess surface activity and therefore do not constitute ballast materials in the final preparation.

"Pourable or free-flowing" preparations are defined as those whose particle size is so small that they are usually poured when they are being packed or when they are being used by the consumer. They include, for example, the various types of powders, such as hollow bead powders, which are obtained by the conventional methods for the production of powdered detergents as well as granules, agglomerates, etc. Other forms of pourable and free-flowing preparations are also within the scope of the invention, including such forms as needles, ribbons, flakes, etc., as prepared with extrusion machines.

The alkyl or cycloalkyl sulfonates to be used according to the invention are derived from saturated straight-chain or branched-chain fatty acids having 8 to 24 and preferably 10 to 18 carbon atoms. The alkyl or cycloalkyl sulfonates can be obtained in various ways. Thus, for example, saturated or unsaturated, non-aromatic—i.e., aliphatic, cycloaliphatic or mixed aliphatic or cycloaliphatic hydrocarbons, can be subjected to a sulfo-chlorination process conducted in the usual manner to produce the corresponding sulfo-chlorides which may additionally contain chlorine bound to carbon atoms. On saponifying the sulfo-chloride group, the sulfonates are obtained therefrom. Additionally by the sulfo-oxidation of the hydrocarbon and preferably saturated hydrocarbons as set out above, it is possible to produce the corresponding sulfonates. Alternatively, the sulfonates can be obtained by sulfonating an aliphatic or cycloaliphatic olefin with sulfurtrioxide or chloro-sulfonic acid and saponifying the reaction product primarily obtained. The said sulfonates of course may contain double bonds and/or hydroxyl groups. A process for the manufacture of bright colored olefin sulfonates from straight-chained terminally unsaturated olefins is described in United States patent application Ser. No. 292,436, filed July 2, 1963. The described process consists in reacting an olefin and preferably a straight-chained mono-olefin having 8 to 22 carbon atoms and having terminal unsaturation with 1.0 to 1.7 mols of sulfurtrioxide per mol of olefin, thereafter hydrolyzing the recovered sulfonation product in an acid or alkaline medium, and then bleaching it with an inorganic oxidant. The sulfonation product may contain double bonds and/or free hydroxyl groups. For the sake of simplicity hereinafter, the sulfonates will be called "alkyl sulfonates."

The sulfo-fatty acids suitable for use according to the invention or their salts are derived from saturated straight-chained or branched fatty acids having 10 to 24, and preferably 12 to 18 carbon atoms. The sulfonic acid group preferably being in the α-position, as, for example, the sulfo-fatty acid of the formula

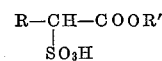

The salts of the sulfo-fatty acids, as well as of the aforesaid alkyl sulfonates, can be sodium, potassium, magnesium, or ammonium salts or salts produced from an amine or an organic base, preferably one having a maximum of 6 carbon atoms. The sulfo-fatty acids can be present as mono-or-di-salts, the di-salts being preferred. For the sake of simplicity, hereinafter the salts of sulfo-fatty acids will be called "di-salts," though this term is intended to cover the monosalts as well.

Sulfonation products which contain sulfo-fatty acids or salts thereof in admixture with one another are suitable for use in the preparation of the pourable and free-flowing detergents, wetting agents, and emulsifiers in accordance with the invention. These sulfonation products can be obtained, for example, by sulfonating mixtures of fatty acids with a sulfonating agent, such as, for example, sulfuric acid, chloro-sulfonic acid and the like in the customary manner (supra).

In the preparation of the sulfo-fatty acid salts—i.e., di-salt component, in accordance with the invention, the fatty acids are generally of natural origin, and, in the production of the sulfo-fatty acid salt, the starting fat material is selected on the basis that its fatty acid composition will come closest to that which is required for producing the desired properties in the final sulfo-fatty acid salt.

Examples of fatty acids which are suitable include such as stearic, palmitic, oleic, coconut fatty acids, palm oil, palm kernel oil, and other natural fatty acids having similar compositions. However, fats which are formed predominantly of higher fatty acids are also suitable. An instance of such a fat is tallow. The fatty acids may also be of synthetic origin.

The compositions in accordance with the invention can be prepared in any desired manner, i.e., the method of adding the di-salt to the sulfonate to improve and stabilize its free-flowing properties may vary considerably. For example, the sulfonates or pourable free-flowing preparations containing the same can be added directly to the di-salts. If care is taken to ensure that the particle size of the di-salts is substantially smaller than that of the sulfonates or of the preparations containing the same, then small amounts of di-salts will often suffice to produce a thin coating of di-salt on the surface of the sulfonates or on the surface of the preparations containing them and thus act to reduce or prevent mutual contact between particles containing sulfonates. In this connection, preferably the average particle size of the sulfo-fatty acid salts should amount to a maximum of $1/5$ and most preferably a maximum of $1/10$ that of the sulfonates.

The novel compositions of the invention can also be prepared by methods which produce a mixture of the sulfonates and di-salts that is practically homogeneous even as concerns molecular dimensions. This can be carried out by any process for accomplishing the desired homogenization, such as is well known to the industry, as for example by spray-crystallizing or spray-drying a solution or paste of sulfonates and di-salts. For example, the di-salt may be added in dry form to the sulfonate in paste form and incorporated therein by any of a number of well-known methods. The mixture may then be dried in any manner, such as for example, spray-drying or drum-drying to give it a variety of forms as above set out. If the two salts, namely the di-salt and the sulfonate, are not completely dissolved in the mixture, which is prepared for spray-drying or drum-drying, etc., the sulfonate and di-salt mixture will be one which is not after final treatment a substantially homogeneous one, down to molecular dimensions. However, the inhomogeneous starting mixtures are eminently suitable for use in accordance with the invention.

According to the invention, the sulfo-fatty acids (di-salts) are effective when the sulfo-fatty acids are present in the combination in an amount as low as 5% of the total weight of the mixture of the sulfonates and di-salts. In general, it is unnecessary to use more than 65% by weight of the total weight of the mixture of the sulfonate salts and di-salts. Preferably, the di-salt content should be from 10 to 40 percent by weight of the said mixture.

It has furthermore been found that the above-described improvement in powder properties produced by incorporation of the di-salts can also be obtained when the preparations contain in addition to the sulfonates other conventional surface-active agents, and in particular anionic surfactants. These include the alkali soaps derived from saturated or unsaturated fatty acids having 10 to 24, preferably 10 to 18, carbon atoms in their molecule.

The amount in which the other surface-active materials can be present depends entirely on the preservation of the desirable powder properties in the composition by the di-salts. This depends to a great extent on the powder properties and characteristics of the other surface-active materials. Preferably, the additional surface-active materials should not be present in an amount greater than 65 weight percent and preferably should be present in an amount less than 50 weight percent, and most preferably less than 40 weight percent, with reference to the mixture of the sulfonates and the additional surfactants. A particularly favorable percentage range for the additional surfactants amounts to 5 to 30 weight percent. As has been noted heretofore, according to the invention, the di-salts should be present in an amount of 5% of the total weight of the mixture of sulfonates and di-salts. Preferably, however, the same should be present in an amount of more than 10 weight percent with respect to the total mixture of sulfonates, other surfactants and di-salts; the sulfonate content in the three-component mixture (sulfonates, surfactants, and di-salts) advantageously amounts to at least 25 weight percent and more advantageously to at least 35 weight percent.

The total amount of wash-active ingredients present in the composition in accordance with the invention amounts to from 10 to 75%, and preferably amounts to 50% of the total weight of the final pourable preparation.

By suitably combining the sulfonates, di-salts, and other anionic surfactants, it is possible to extensively influence the wetting, detergent, cleansing, foaming, and emulsifying properties of the preparations of the invention. In particular, the foaming and/or sudsing properties can be varied. Thus, for example, combinations of sulfonates, di-salts, and soap are suitable as low-suds producing washing machine detergents and, particularly so, when the soaps or free fatty acids corresponding thereto have contents of more than 50% of their weights of saturated fatty acid radicals having 16 or more carbon atoms, although fatty acid radicals having 20 and more, and particularly having 20 to 26 carbon atoms, are present.

The combinations of the invention can be used per se as detergents, wetting agents, and emulsifiers, or can be employed together with the known additives conventionally used in such preparations. The percentage of the wash-active mixture in the combination should amount to 10 to 75%, preferably 15 to 50% of the weight of the entire pourable preparation.

As noted above, the detergent, wetting, or emulsifying compositions in accordance with the invention are suitable for use per se or in admixture with the conventional products employed in the formulations of such agents. A particularly advantageous application of the combinations in accordance with the invention is as wash-agents for use in the washing and bleaching treatment of textiles. In this connection, additives which impart to the final preparation a pH value within the range of 6 to 12 have proved particularly suitable. The pH value is determined using as test sample a 1% solution of a detedgent composition. The pH range extending from 6 to 12 includes the agents intended as fine wash-agents and which are required to be regulated so as to have a slightly acid to alkaline pH, i.e., approximately within the range of 6 to 8.5 and preferably within the range of 7 to 8, as well as the agents intended for use as boiling wash-agents and having a pH value approximately within the range of 9 to 12 and preferably of 9.5 to 11.5.

The combinations in accordance with the invention may be employed in conjunction with neutral or alkaline reacting salts, slightly acid reacting compounds as well as with the customary agents used to improve foaming, soil removal, and such additives as bleaching agents, corrosion protection agents, etc.

A neutral reacting salt which is most advantageously used is sodium sulfate, the same additionally acting to improve the effectiveness of the combination in accordance with the invention. It can be replaced, however, in whole or in part by non-surfactive, neutral reacting organic salts, such as, for instance, non-surface-active arylsulfonate, exemplified by such compounds as benzene, toluene, or naphthaline sulfonates.

The wash-alkalis which are suitable for use in connection with the invention include the alkali carbonates, alkali bicarbonates, water-soluble alkali silicates, alkali orthophosphates, etc.

The combinations in accordance with the invention may be used to particular advantage in conjunction with the anhydrous phosphates. The anhydrous phosphates employed may be any pyrophosphate, polyphosphate, or metahosphate; the tripolyphosphates and tetrapolyphosphates having been found to possess particular practical significance. The pyro- and poly-phosphates are alkaline in reaction and are, therefore, able when used alone in boiling wash-agent compositions to impart to the same the necessary alkalinity; however, the metaphosphates produce a slightly acid reacton and are therefore advantageously utilized in the production of fine-wash agents serving to decrease the pH value of the resulting combination. Examples of other phosphates suitable for the same purpose include the acid orthophosphates, and the acid pyrophosphates. Weak inorganic or organic acids or acid salts of strong inorganic acids, such as, for example, boric acid, citric acid, oxalic acid, lactic acid, glycolic acid, tartaric acid, amidosulfonic acid, and sodium bisulfate are instances of other materials suitable for use in regulating the pH value of the washing agent.

Still further, the preparations in accordance with the invention may be used in combination with the other conventional substances as are used in wash agents. These substances include inorganic or organic-active oxygen carriers, as, for example the percompounds, such as percarbonates, persulfates, perorthophosphates, perpyrophosphates, perpolyphosphates, and, in articular, alkali metal perborates. Products functioning to improve the soil removal property and foaming qualities of the combinations are additionally included in the preparation of wash agents. Instances of substances serving to improve the soil removal capacity include water-soluble colloids, and preferably those of an organic nature, as, for example, the water-soluble salts of polymeric carboxylic acids, sizes, gelatin, salts of ether carboxylic acids or other sulfonic acids of starch or cellulose, or salts of acid sulfuric acid esters of cellulose or starch. Additives for improving the foaming capacity of the combinations of the invention include fatty acid amides which may be substituted at the nitrogen atom with alkyl or alkylol-radicals having at most 6 carbon atoms per radical, as well as the addition products of ethylene oxide to these unsubstituted or substituted fatty acid amides.

The salts which may be added to the combinations in accordance with the invention may be derived from inorganic or organic alkalis as, for example, from sodium, potassium, or from the easily soluble organic amines. Such salts include alkylolamines, for example, mono-, di-, or tri-ethanolamine.

It can be appreciated that it is generally desirable in compounding detergent preparations that in spite of the high concentrations of active material, they do not form the substrates readily. To this end, it is advisable to use in connection with the additions, anions which are already present in the combination, although similar thought has to be given to the anionic additives as they are advantageously added in the form of their readily soluble with inorganic or organic cations. It is, therefore, advisable to look, in many instances, for the presence of the various cations in the combinations, paving the way for satisfactory further additions.

The combinations, in accordance with the invention, as has already been noted, are suitable for use alone or, as has just been set out, in combination with various additives, numerous instances of which have been set out.

In U.S. application Ser. No. 278,780, now Patent No. 3,274,117 filed May 7, 1963, there are described pourable and free-flowing detergents, wetting agents, and emulsifiers, particularly in powdered form, having a content of surface-active sulfo-fatty acid ester salts and sulfo-fatty acid salts, and which can further contain alkyl sulfonates. In the case of the preparations described in application Ser. No. 278,780, now Patent No. 3,274,117 the sulfo-fatty acid ester salts represent a critical component and are required to be present in an amount of at least 35 weight percent with reference to the mixture of fatty acid ester salts and alkyl sulfonate. In the composition of the present invention there are substantially no fatty acid ester sulfonates present. If they should be present, their quantity is less than 35% by weight with reference to the mixture of fatty acid ester salts and alkyl sulfonate.

The following examples illustrate the invention without limiting it thereto:

A number of compositions were prepared for evaluating their effectiveness as detergents, wetting agents, emulsifiers, namely powdery preparations containing a di-salt and similar powdery preparations substantially free of di-salts were prepared for evaluation under comparative conditions. In making the test powders, the component materials were dissolved and the resulting aqueous solutions converted in a spray drier to a fine powder having a moisture content of about 2 to 7%. All of the powders so prepared could be passed in their entirety through a sieve having a clear mesh width of 4.25 mm. 230 cc. of each of the powders were then filled into detergent boxes, sealed and stored in an atmospheric test chamber, through which air was circulated, for 7 days at 32° C. and 80% relative humidity. The detergent boxes which were used were made of the usual strawboard and contained no lining or additive for preventing the exchange of moisture through the box walls. At the end of this period, the boxes were opened and their contents were examined for caking and tested for pourability.

In order to exclude the introduction of any possible error resulting from contact with the human hand, the apparatus (which is commercially available) shown in the drawing and described hereinafter was used in the experimental procedures.

The apparatus consisted of a Plexiglas drum 1 having a cylindrical middle portion and open-ended conically tapering end portions. The total length of the Plexiglas drum amounted to 26.5 cm., the diameter of each end opening to 5 cm. and the diameter of the central, cylindrical portion to 16 cm. The central cylindrical portion measured 5 cm. in length. A shaft, the extension of which does not touch the drum axis is arranged on the central cylindrical portion and is so attached thereto that with the laterally attached shaft in the horizontal position, the axis of the drum forms an angle of 79 degrees with the horizontal. The shaft attached to the central portion of the drum is connected in the horizontal position with the shaft of the speed-controlled electric motor 2. One of the two drum openings is then closed, the contents of a test box of detergent is poured through the other upwardly directed drum opening and a screen having a clear mesh spacing of 4.25 mm. placed thereover. The motor is then started, the rotary speed always being adjusted to 40 revolutions per minute. The time is measured from the starting of the motor until all of the powder has passed through the screen 3 or to the end of the time set for the experiment. The experiment is generally stopped where no appreciable amount of powder has flown through the screen. The residue remaining on the screen is collected and weighed.

The results as stated in the examples hereinafter, therefore, characterize on the one hand the tendency of the powder to cake and on the other hand its ability to flow freely. The tendency of the powder to cake can be appreciated from the amount of residue left on the screen while the time it takes for the powder to run through the sieve is a measure of its free-flowing ability.

The data obtained in the experiments are recorded in the following table: unless otherwise expressly stated, the salts are sodium salts and, in the case of the sulfonated fatty acid salts, they are disodium salts.

"Mersolat" indicates an alkyl sulfonate having 12 to 18 carbon atoms, which is obtained by partially sulfochlorinating an appropriate hydrocarbon with a mixture of sulfur trioxide and chlorine, saponifying the sulfochloride with caustic soda solution, and separating the unsaponifiable substances.

"Olefin sulfonate" designates a product which has been obtained by sulfonating a terminally unsaturated straight-chained olefin with sulfur trioxide diluted with inert gas and neutralizing, hydrolyzing, and bleaching the resulting sulfonation product.

| Ex. No. | Composition of the Preparation | Weight percent left on screen | Sieve run-through time |
|---|---|---|---|
| 1a | 50% "Mersolat", 50% $Na_2SO_4$ | 48 | 10 min. |
| 1b | 40% "Mersolat", 10% Sulfo-fatty acid salt from hardened coconut fatty acid, 50% $Na_2SO_4$. | 0 | 3 min. |
| 1c | 40% "Mersolat", 60% $Na_2SO_4$ | 40 | 10 min. |
| 2a | 40% $C_{14}$–$C_{18}$ Olefin sulfonate, 60% $Na_2SO_4$. | 8 | 10 min. |
| 2b | 35% $C_{14}$–$C_{18}$ Olefin sulfonate, 5% Sulfo-fatty acid salt from lauric acid, 60% $Na_2SO_4$. | 0 | 3 min. |
| 2c | 40% $C_{14}$–$C_{18}$ Olefin sulfonate, 10% Sulfo-fatty acid salt from lauric acid, 50% $Na_2SO_4$. | 3 | 10 min. |
| 3a | 50% Olefin sulfonate $C_{14}$–$C_{18}$, 50% $Na_2SO_4$. | 12 | 10 min. |
| 3b | 45% Olefin sulfonate $C_{14}$–$C_{18}$, 5% Sulfo-fatty acid salt from lauric acid, 50% $Na_2SO_4$. | 6 | 10 min. |
| 4a | 10% Sulfonate made from hardened coconut oil, 30% "Mersolat", 60% Sodium sulfate ($Na_2SO_4$). | 0 | 7 min. |
| 4b | 30% "Mersolat", 5% Sulfo-fatty acid salt made from hard coconut fatty acid, 5% Sulfonate made from hardened coconut oil, 60% $Na_2SO_4$. | 0 | 100 sec. |

We claim:

1. A powder form surface-active detergent composition characterized by outstanding pouring and free-flowing properties consisting of:
   (a) about 35–95 wt. percent of a surface active water soluble alkyl or cycloalkyl sulfonate, and
   (b) about 5–65 wt. percent of a salt of an α-sulfo-fatty acid having 10–24 carbon atoms in its molecule, the cation of said salt being selected from the group consisting of Na, K, Mg, $NH_4$, mono-, di- and tri-alkanolamines.

2. A powder form surface active composition according to claim 1 wherein said sulfo-fatty acid salt is present in an amount of from 10 to 40% based on the total weight of the composition.

3. A powder form surface active composition according to claim 1 wherein said sulfo-fatty acid salt is a disalt.

4. A powder form surface active composition according to claim 1 wherein said alkyl or cycloalkyl sulfonate and said salt of α-sulfo-fatty acid are each present in said composition in discrete particle form.

5. A powder form surface active composition according to claim 4 wherein the average particle size of said particles comprising the sulfo-fatty acid salt is at most one-fifth that of the average particle size of the particles comprising the alkyl or cycloalkyl sulfonate.

6. A powder form surface active composition according to claim 1 wherein said alkyl or cycloalkyl sulfonate and said salt of a sulfo-fatty acid are present together in the same particle.

References Cited

UNITED STATES PATENTS

| 2,195,145 | 3/1940 | Crittenden | 252—161 X |
| 2,195,186 | 3/1940 | Moyer | 252—161 X |
| 2,460,968 | 2/1949 | Bert et al. | 252—161 X |
| 2,653,913 | 9/1953 | Van Dijck et al. | 252—161 |
| 2,867,586 | 1/1959 | Weil et al. | 252—152 |
| 3,104,247 | 9/1963 | Gavlin et al. | 260—400 |
| 3,186,948 | 9/1965 | Sweeney | 252—161 |
| 3,274,117 | 9/1966 | Stein et al. | 252—161 |

OTHER REFERENCES

Stirton, The Journal of the American Oil Chemists' Society, November 1962, vol. 39, No. 11, 490–496.

LEON D. ROSDOL, *Primary Examiner.*

ALBERT T. MEYERS, *Examiner.*

S. E. DARDEN, *Assistant Examiner.*